United States Patent [19]

Yamamoto et al.

[11] Patent Number: 4,558,247
[45] Date of Patent: * Dec. 10, 1985

[54] LIQUID-SEAL TYPE MOTOR HAVING INSULATING OIL PRESSURE COMPENSATION

[75] Inventors: Sakuei Yamamoto; Kiyonori Tokumitsu, both of Fukuoka, Japan

[73] Assignee: Mitsubishi Denki Kabushiki Kaisha, Tokyo, Japan

[*] Notice: The portion of the term of this patent subsequent to Dec. 10, 2002 has been disclaimed.

[21] Appl. No.: 632,122

[22] Filed: Jul. 18, 1984

[30] Foreign Application Priority Data

| | | | |
|---|---|---|---|
| Jul. 27, 1983 | [JP] | Japan | 58-138521 |
| Jul. 28, 1983 | [JP] | Japan | 58-139761 |
| Jul. 28, 1983 | [JP] | Japan | 58-139762 |

[51] Int. Cl.$^4$ .............................................. H02K 5/10
[52] U.S. Cl. ..................................... 310/87; 417/414
[58] Field of Search ...................... 310/86, 90, 87, 153, 310/88, 85; 417/414, 424

[56] References Cited

U.S. PATENT DOCUMENTS

| | | | |
|---|---|---|---|
| 2,002,907 | 5/1935 | Sessions | 417/414 |
| 2,687,695 | 8/1954 | Blom | 310/87 |
| 2,887,061 | 5/1959 | Cametti | 310/87 |
| 3,072,810 | 1/1963 | Luenberger . | |
| 3,116,432 | 12/1984 | Ekey . | |
| 3,135,884 | 6/1964 | Luenberger . | |
| 3,209,183 | 9/1965 | Bollibon | 310/87 |

Primary Examiner—R. Skudy
Attorney, Agent, or Firm—Oblon, Fisher, Spivak, McClelland & Maier

[57] ABSTRACT

A liquid-seal type motor comprising a cylindrical frame, a stator fixed inside the frame, a can placed at the inner circumferential side of the stator, a pair of end plates placed at both ends of and between the frame and a can to be sealingly connected thereto to thereby form an insulating oil enclosing part in which the stator is confined, a pair of brackets connected to the pair of the end plates respectively and a rotor placed in the can to be journaled by the brackets, a lubricating oil enclosing part being defined by the can, brackets and rotor wherein a flexible pressure adjusting means is placed in the insulating oil enclosing part to sealingly define the interior of the part into two chambers.

9 Claims, 12 Drawing Figures

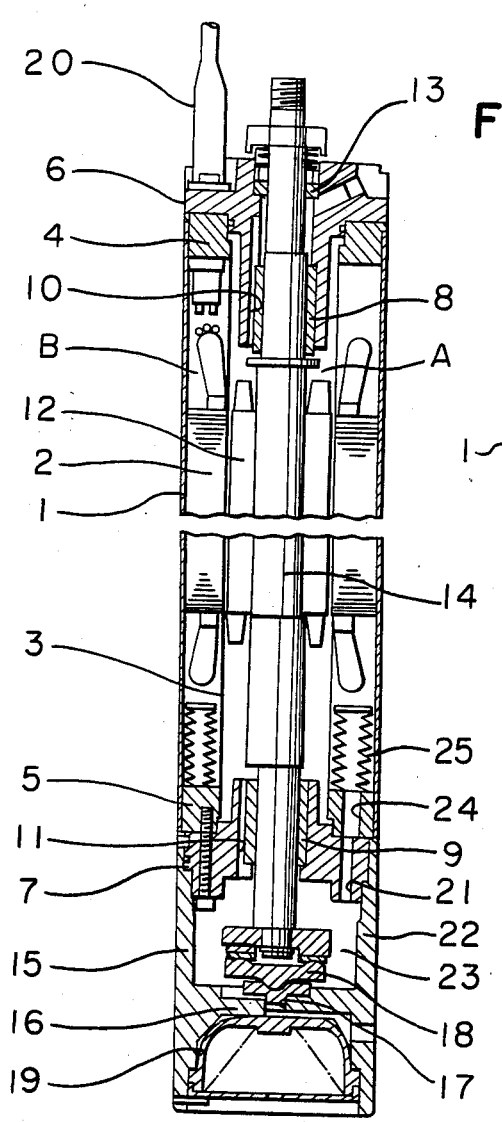
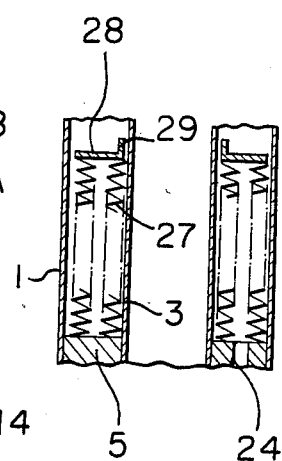
FIGURE 2
FIGURE 3

LIQUID-SEAL TYPE MOTOR HAVING INSULATING OIL PRESSURE COMPENSATION

BACKGROUND OF THE INVENTION

1. Field of the Invention

The present invention relates to an improvement in a liquid-seal type motor in which a rotor section is filled with a lubricating oil and a stator section is filled with an insulating oil.

2. Description of the Prior Art

A conventional liquid-seal type motor will be described with reference to FIG. 1. In FIG. 1, there is shown a cylindrical frame 1. A stator is fixed onto the inner circumferential surface of the frame 1 and a cylindrically formed can 3 is arranged at the inner side of the stator 2. Upper and lower annular end plates 4, 5 are respectively placed at upper and lower ends of and between the can 3 and the frame 1 to be sealingly connected to them. Upper and lower brackets 6, 7 are sealingly connected to the upper and lower end plates 4, 5 respectively. The upper bracket 6 receives in its axial bore an upper bearing 8 to journal the upper part of a rotary shaft 14 on which a rotor 12 is fixed and a communication channel 10 is formed in the axial bore of the upper bracket 6 extending over the entire length of the upper bearing 8. The lower bracket 7 also receives in its axial bore a lower bearing 9 to journal the lower part of the rotary shaft 14 and a communication channel 11 is formed in the axial bore of the lower bracket 7 passing through the same. A shaft sealing device 13 is arranged in the upper bracket 6 to seal the upper end of the rotary shaft 12. The lower bracket 7 is attached at its lower end with a thrust casing 15 which has upper and lower cylindrical parts and an intermediate wall portion 16 at the center of which a through hole 17 is formed. A thrust bearing 18 is supported by the intermediate wall portion 16 to bear a thrust load of the rotary shaft 14. A diaphragm 19 is sealingly fitted to the lower cylindrical recess of the thrust casing 15 to adjust a pressure of lubricating oil filled inside the can 3, the pressure being applied through the communication channel 11 and the through hole 17. A current feeding cable 20 is sealingly connected to the upper bracket 6 to extend to the stator 2.

The cylindrical frame 1, the can 3 and the end plates 4, 5 cooperate to define an insulating oil enclosing part B in which the stator 2 is surrounded by insulating oil, while the can 3, the upper and lower brackets 6, 7 and the rotor 12 cooperate to define a lubricating oil enclosing part A in which the rotor 12 is surrounded by lubricating oil.

In the conventional liquid-seal type motor as described above, when a current is supplied to the stator 2 through the current feeding cable 20, the rotor 12 is rotated to drive a pump (not shown) and so forth connected to the rotary shaft 14 as is well-known.

The operation of the motor causes temperature rise in the stator 2 and the rotor 12 to cause volume expansion of the lubricating oil and the insulating oil contained in the motor. In this case, the frame 1, the can 3 and the upper and lower end plates 4, 5 are jointed by welding at their adjoining parts and accordingly, the insulating oil is certainly enclosed and does not leak outside. On the other hand, the lubricating oil tends to leak out because the rotary shaft 14 passes through the upper bracket 6 even though the shaft sealing device 13 is provided. However, since the diaphragm 19 is sealingly connected to the thrust casing 15, volume expansion of the lubricating oil is absorbed by deformation of the diaphragm 19 through the communication channel 11 and the through hole 17 to thereby prevent pressure rise in the lubricating oil enclosing part A, i.e., increase of a pressure applied to the rotor 12.

When a liquid-seal type motor is used at a high pressure and high temperature, the volume expansion of the lubricating oil and the insulating oil is extremely large. Especially, a pressure in the insulating oil enclosing part B in which the stator 2 is confined becomes high since the insulating oil is completely sealed by the frame 1, and can 3 and the upper and lower end plates 4, 5. As a result, a high pressure is applied to the can 3 formed of a thin plate to thereby cause deformation of the can 3 on the side of the rotor 12. The deformation of the can 3 may cause a serious accident that the can 3 restricts the revolution of the rotor 12 or the joint portions between the upper and lower end plates 4, 5 is broken.

SUMMARY OF THE INVENTION

It is an object of the present invention to eliminate the disadvantage of the conventional device and to provide a liquid-seal type motor not to cause increase in size and breakage of a can by providing means for absorbing an inner pressure produced in an insulating oil enclosing part.

The foregoing and the other objects of the present invention have been attained by providing a liquid-seal type motor comprising a cylindrical frame, a stator fixed inside the frame, a can placed at the inner circumferential side of the stator, a pair of end plates placed at both ends of and between the frame and the can to be sealingly connected thereto to thereby form an insulating oil enclosing part in which the stator is confined, a pair of brackets connected to the pair of the end plates respectively and a rotor placed in the can to be journaled by the brackets, a lubricating oil enclosing part being defined by the can, brackets and rotor, characterized by comprising a flexible pressure adjusting means placed in the insulating oil enclosing part to sealingly define the interior of the part into two chambers.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

FIG. 2 is a longitudinally cross-sectional view of a first embodiment of the liquid-seal type motor according to the present invention;

FIG. 3 is a cross-sectional view of an important part of a second embodiment of the present invention;

DETAILED DESCRIPTION OF THE PREFERRED EMBODIMENT

Figure 1:
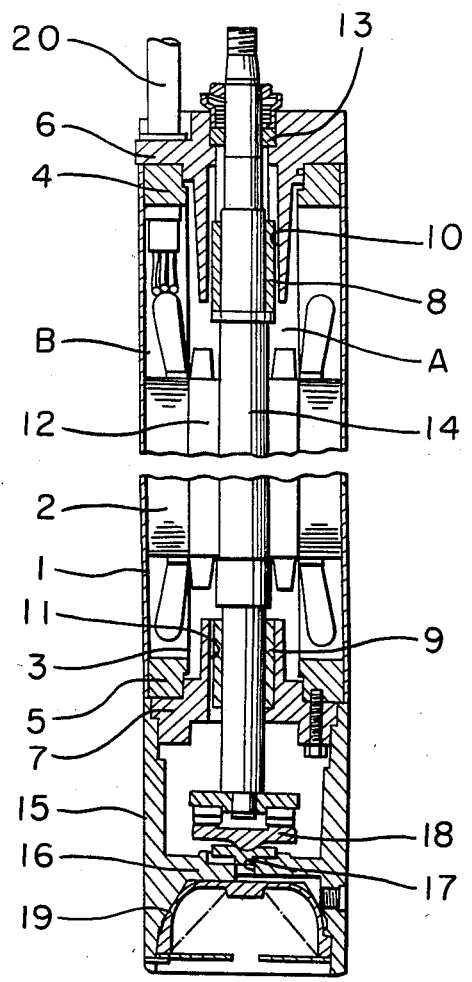
FIG. 1 is a longitudinally cross-sectional view of a conventional liquid-seal type motor.

The first embodiment of the present invention will be described with reference to FIG. 2 in which the same reference numerals as in FIG. 1 designate the same or corresponding parts. A conduit 21 is formed in the lower bracket 7 in the vertical direction, the lower part of the conduit being opened to a chamber 23 in the upper cylindrical part 22 of the thrust casing 15. A communicating passage 24 is formed in the lower end plate 5 passing through in the vertical direction to communicate with the conduit 21. There is provided an annular bellows 25 made of a metallic material which is placed between the frame 1 and the can 3 so as to surround outer circumference of the can 3 and which is sealingly connected to the lower end plate 5, the inside of the annular bellows 25 being communicated with the communicating passage 24.

In the embodiment described above, even when the volume of the insulating oil largely expands, an amount of oil increased by the expansion is compensated by the metallic bellows 25. Namely, the pressure difference between lubricating oil enclosing part A and the insulating oil enclosing part B causes expansion and contraction of the metallic bellows 25 to absorb the pressure difference because the interior of the metallic bellows 25 placed in the insulating oil enclosing part B is communicated with the lubricating oil enclosing part A through the communicating passage 24, the conduit 21, the space 23 and the lower communication channel 11. Accordingly, a pressure applied to the rotor 12 is equal to a pressure applied to the stator 2.

In the next place, a second embodiment of the present invention will be described with reference to FIG. 3. A ring-shaped plate 28 is sealingly connected to the top of a bellows core 27 which is in turn connected at its lower end to the lower end plate 5 in a closed manner and the interior of the bellows core 27 is communicated with the communicating passage 24. A guiding projection 29 is formed at the inner peripheral edge of the ring-shaped plate 28 so that it slidably moves in the axial direction along the outer surface of the can 3.

In the second embodiment, expansion and contraction of the bellows core 27 can be smooth because the metallic bellows 25 is guided by the guiding projection 29 along the can 3.

Figure 4:
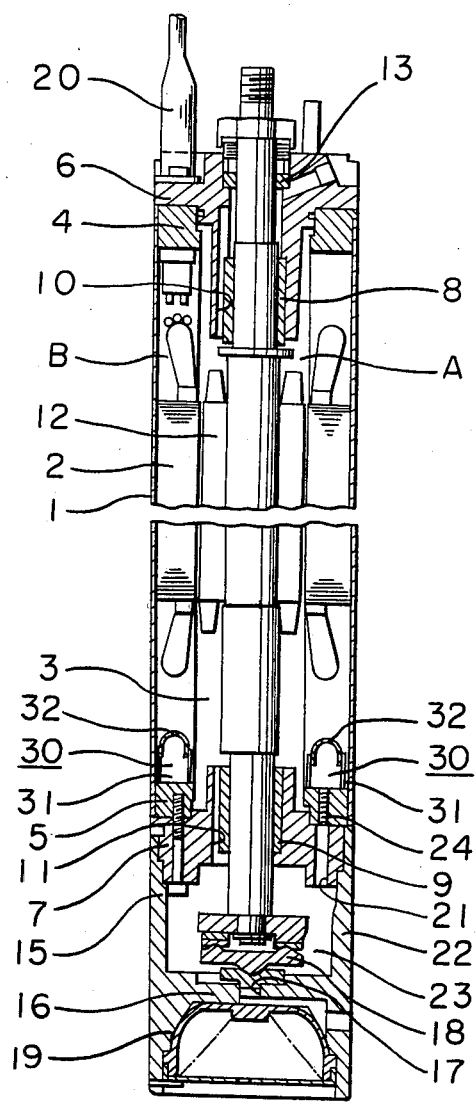
FIG. 4 is a longitudinally cross-sectional view of a third embodiment of the present invention.

In FIG. 4 showing a third embodiment of the present invention, there is provided between the can 3 and the frame 1 a diaphragm 30 which is sealingly connected to the lower end plate 5 to divide the insulating oil enclosing part B into two sections and which comprises a cylindrical part 31 and a deformable part 32 and the cylindrical part 31 is communicated with the communicating passage 24.

In the third embodiment, a volume of the insulating oil resulted by expansion is absorbed by deformation of the deformable part 32 of the diaphragm 30. Since the diaphragm 30 is constituted by the deformable part 32 and the cylindrical part 31, it can be easily manufactured. Particulary, when the deformable part 32 and the cylindrical part 31 are formed of a single body, manufacturing operations are further improved.

Figure 5:
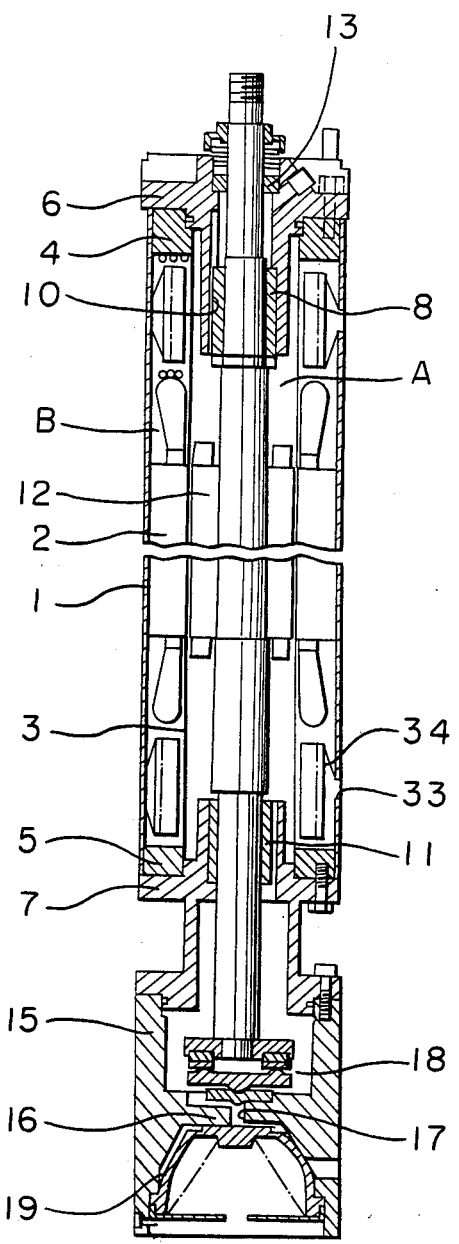
FIG. 5 is a longitudinally cross-sectional view of a fourth embodiment of the present invention.
Figure 6:
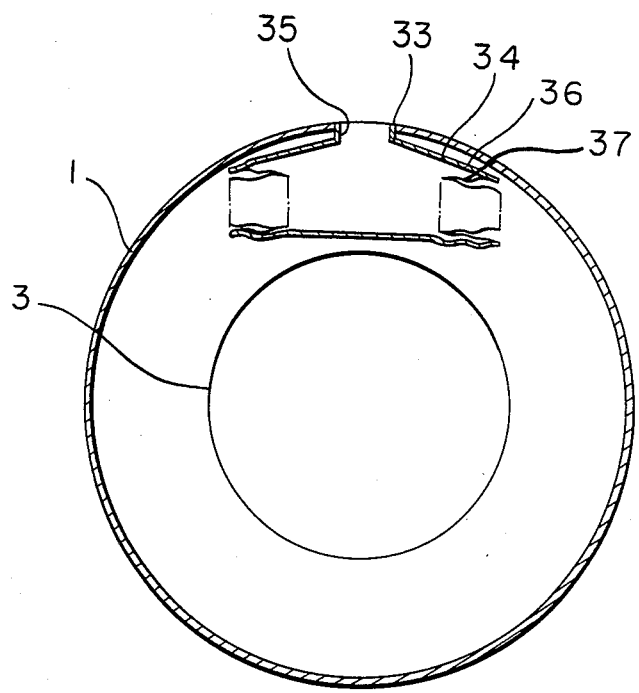
FIG. 6 is a cross-sectional view of an important part taken along the line VI—VI in FIG. 5.

A fourth embodiment of the present invention will be described with reference to FIGS. 5 and 6. A plurality of openings are formed in the circumferential surface of the frame 1. A plurality of metallic bellows 34 are arranged in the insulating oil enclosing part B formed between the frame 1 and the can 3 so as to direct in the radial direction and each of the metallic bellows is sealingly connected to the frame 1 so that the end opening 35 of each of the bellows 34 is communicated with each of the openings 33. The metallic bellows 34 is constituted by an end plate 36 having the end opening 35 and a bellows core 37 sealingly connected to the end plate 36. In the third embodiment as described above, pressure rise in the insulating oil enclosing part B is controlled by contraction of the metallic bellows 34 because the end opening 35 of the bellows 34 is communicated with the outside of the frame 1. On the other hand, pressure rise in the lubricating oil enclosing part A is controlled by contraction of the diaphragm 19. In this case, the openings formed in the frame 1 render the metallic bellows 34 to communicate with the atmosphere in a simple manner.

Figure 7:
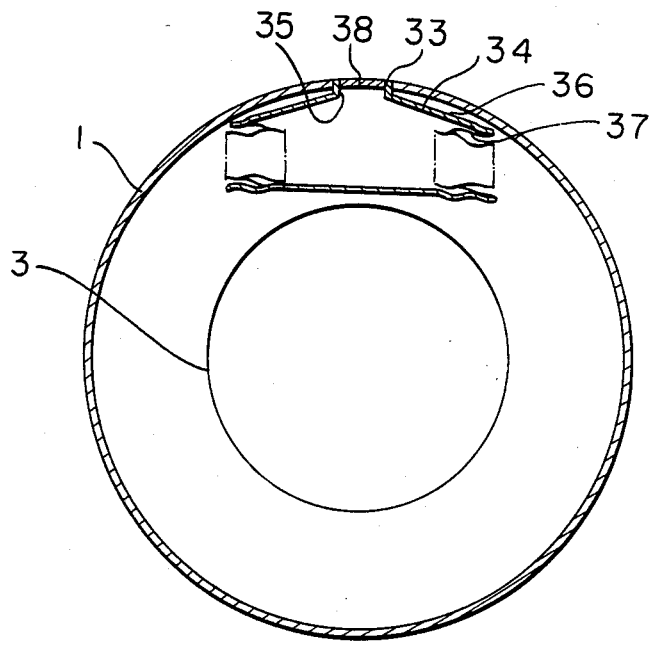
FIG. 7 is a cross-sectional view of an important part of a fifth embodiment of the present invention.

FIG. 7 shows a fifth embodiment as a modification of the fourth embodiment. A filter 38 is attached to the end opening 35 to prevent foreign matters from entrance into the metallic bellows 34.

In the first to fifth embodiments of the present invention, a flexible pressure adjusting means is provided in a insulating oil enclosing part formed between a frame and a can to partition the same into a first and second chambers and the second chamber is communicated with a lubricating oil enclosing part or the atmosphere whereby pressure rise caused by volume expansion of insulating oil in the insulating oil enclosing part is controlled by the flexible pressure adjusting means. Particularly, when the liquid-seal type motor of the embodiment is used for a well, installation of the motor can be easy and pressure rise is avoided without increasing the outer diameter of the frame.

Fitting of the bellows to the lower end plate is easily done because the bellows is connected to the end plate itself prior to assembling the end plate in the motor.

Further, the embodiment constructed in such a manner that the insulating oil enclosing part formed between the can and the frame is divided by the diaphragm into two parts makes it easy to prepare the diaphragm.

In the embodiment having a plurality of bellows connected to the frame, the interior of the bellows is easily communicated with the outside of the frame through the opening formed in the outer peripheral surface of the frame 1.

A filter attached to the end opening of the bellows which opens outside prevents foreign matters from entrance into the bellows and assures expansion and contraction of the bellows.

Figure 8:
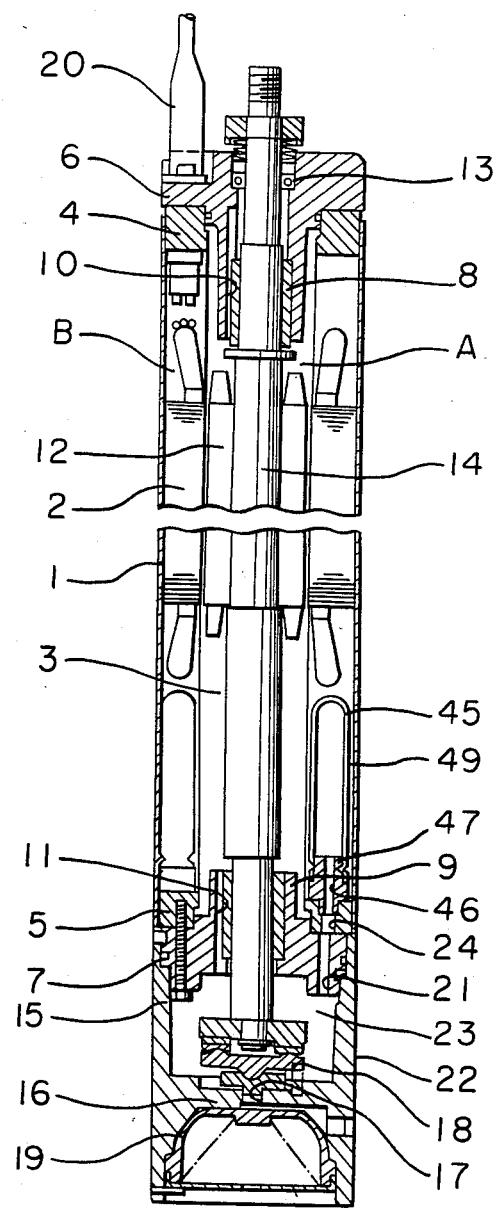
FIG. 8 is a longitudinally cross-sectional view showing a sixth embodiment of the present invention.
Figure 9:
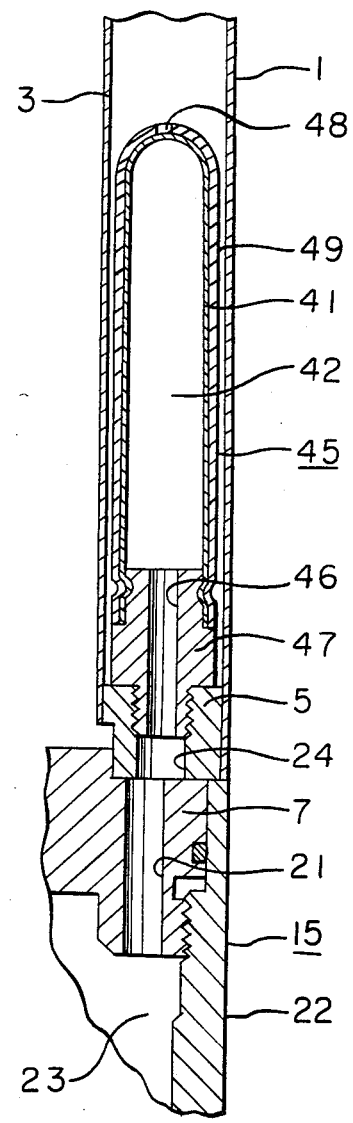
FIG. 9 is an enlarged longitudinally cross-sectional view of FIG. 8.

A sixth embodiment of the present invention will be described with reference to FIGS. 8 to 9. In the figures, there is provided a pressure adjusting means comprising a casing 45 and a flexible member 41. The casing 45 comprises a fitting part 47 having a through hole 46 connected to the communicating passage 24 and a threaded portion which is engaged with the communicating passage 24 and a rigid cylindrical body 49 whose lower open end is sealingly connected to the fitting part 47 and whose upper part extending in the axial direction and between the frame 1 and the can 3 and a small aperature 48 is formed in the top of the cylindrical body 49. The flexible member 41 in a cylindrical form is received in the rigid cylindrical body 49 and has the lower end sealingly connected to the fitting part 47 while having the upper part entirely closed to form a chamber 42 communicated to the through hole 46 and sealed off from a chamber defined by the remainder of the insulating oil enclosing part B.

In the sixth embodiment, when the volume of the insulating oil in the insulating oil enclosing part B is largely expanded due to a temperature rise, an amount of the oil increased by the expansion flows into the casing 45 through the small apeature 48 in the casing 45 and forces the flexible member 41 downwardly. The flexible member 41 is compressed until a pressure in the insulating oil enclosing part B becomes substantially equal to a pressure in the lubricating oil enclosing part A because the chamber 42 of the flexible member 41 is communicated with the lubricating oil enclosing part A through the conduit 21, the communicating passage 24, the through hole 46, the chamber 23 and the communication channel 11. As a result, the pressure difference between the inside and outside of the can 3 is substantially eliminated and deformation of the can 3 on the side of the rotor 12 is prevented. In this case, the flexible member 41 contracts both in the axial and radial directions when compressed. When the flexible member 41 tends to deflect in the radial direction, direct contact of the flexible member 41 to the can 3 is prevented because the flexible member 41 is enclosed in the casing 45.

Figure 10:
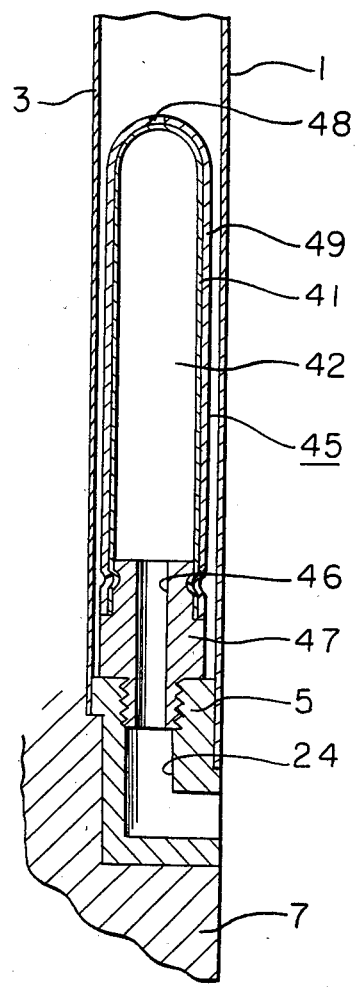
FIG. 10 is an enlarged longitudinally cross-sectional view of a seventh embodiment of the present invention.

FIG. 10 shows a seventh embodiment which is a modification of the sixth embodiment, in which the communicating passage 24 is opened at the outside of the frame 1. With this construction, the insulating oil enclosing part B is always kept at the atmospheric pressure and the same effect as above-mentioned can be obtained.

In the sixth and seventh embodiments of the present invention, there is provided a pressure adjusting means in the insulating oil enclosing part which comprises a casing placed between the frame and the can and connected to the lower end plate, the casing having a communicating passage communicated with the lubricating oil enclosing part or the atmosphere and having a cylindrical body extending in the axial direction of the frame and a flexible member received in the casing to define the interior of the casing into a chamber communicated with the communicating passage and a chamber communicated with the insulating oil enclosing part. With the construction, the pressure difference between the inside and the outside of the can is controlled to prevent abnormal deformation of the can. The casing enclosing therein the flexible member prevents it from direct contact to the can to thereby prevent abnormal deformation of the can resulted from expansion and contraction of the flexible member.

Figure 11:
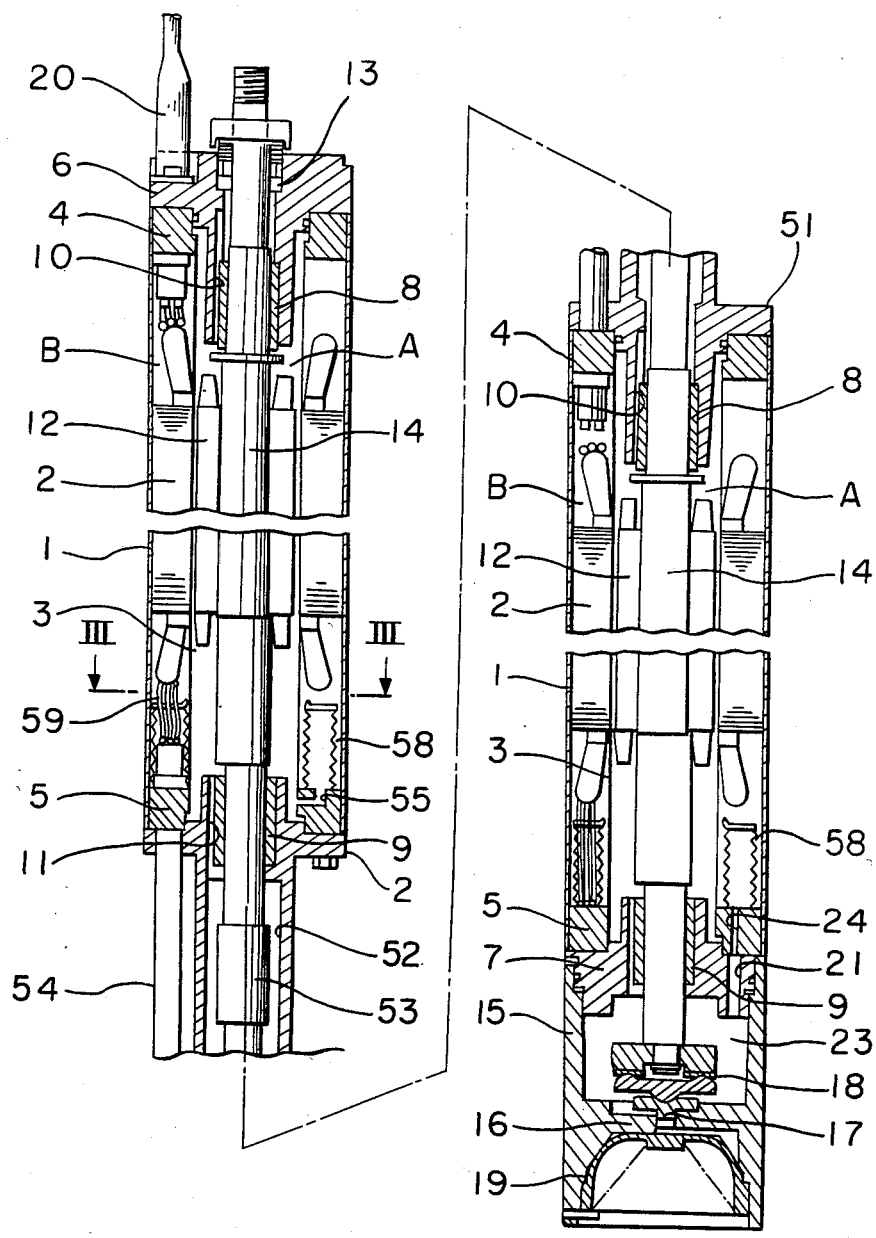
FIG. 11 is a longitudinally cross-sectional view of eighth embodiment of the present invention.
Figure 12:
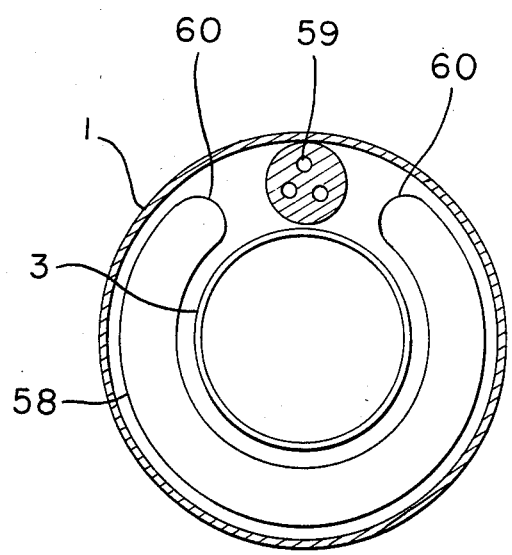
FIG. 12 is a cross-sectional view taken along the line III—III in FIG. 11.

FIGS. 11 and 12 show a eighth embodiment of the present invention in which there is provided an intermediate bracket 51 which is sealingly connected to in one hand the upper end plate 4 of a motor placed at the lower position and on the other hand to the lower end plate 5 of a motor placed at the upper position in serially arranged two liquid-seal type motors. The intermediate bracket 51 has an inner bore 52 extending vertically, which receives therein a coupling 53 which connects the rotary shafts 14 of the serially arranged motors. An intermediate connecter 54 extends through the franges of and along the bracket 51 in the vertical direction to sealingly connect each of lead wires of the stators of the serially arranged motors. In the lower end plate of the motor arranged at the upper position, an orifice 55 is formed to communicate pressures between the insulating oil enclosing part B and the lubricating oil enclosing part A by means of a bellows 58 of a shape of horseshoe. A separate bellows 58 of a shape of horseshoe is placed in the insulating oil enclosing part B in the motor placed at the lower position and the lower part of the bellows 58 is connected to the lower end plate 5 so that the interior of the bellows 58 is communicated with the lubricating oil enclosing part A through the communicating passage 24 formed in the lower end plate 5, the conduit 21 formed in the lower bracket 7, the space 23 and the lower communication channel 11. Lead wires 59 extend between both end parts 60 of the bellows 58 of the shape of horseshoe as shown in FIG. 12.

In the eight embodiment having construction abovementioned, when the volume of the insulating oil largely expands, the bellows 58 is compressed by the oil pressure for expansion to thereby control pressure difference between the inside and outside of the can 3. In more detail, the interior of the bellows 58 contained in the insulating oil enclosing part B of the motor placed at the lower position is communicated with the lubricating oil enclosing part A through the communicating passage 24, the conduit 21 and the lower communication channel 11, while the interior of the bellows 58 contained in the insulating oil enclosing part B of the motor placed at the upper position is communicated with the lubricating oil enclosing part A through the orifice 55, on account of which each of the insulating oil enclosing parts B is communicated with each of the lubricating oil enclosing parts A whereby pressure rise in the insulating oil enclosing parts B causes contraction of both the bellows 58 and pressures inside and outside of the can 3 become equal by means of the communicating passage 24, the conduit 21, the lower communication channel 11 and the orifice 55.

When the liquid-seal type motor of the eighth embodiment is assembled, the lead wires 59 for connecting both stators 2 are extended between the end parts 60 of the bellows in the upper motor and are connected to the intermediate connector 54. Provision of the bellows 58 of the shape of horseshoe allows the lead wires 59 to pass through its end parts 60 whereby two liquid-seal type motors can be arranged serially.

Description has been made that the bellows 58 of a shape of horseshoe is placed to communicate the interior of the bellows with the lubricating oil enclosing part A. The same effect can be attained by constructing such that the bellows 58 is communicated with the outside of the frame.

As described above, a plurality of bellows of a shape of horseshoe are placed between the frame and the can so as to be communicated with the lubricating oil enclosing parts A through communicating means and lead wires are arranged at the end parts of the bellows whereby breakage and deformation of the can caused by the volume expansion of the insulating oil can be prevented and a plurality of liquid-seal type motors can be arranged serially.

Obviously, numerous modifications and variations of the present invention are possible in light of the above teachings. It is therefore to be understood that within the scope of the appended claims, the invention may be practiced otherwise than as specifically described herein.

We claim:

1. A liquid-seal type motor comprising a cylindrical frame, a stator fixed inside said frame, a can placed at the inner circumferential side of said stator, a pair of end plates placed at both ends of and between said frame and said can to be sealingly connected thereto to thereby form an insulating oil enclosing part in which said stator is confined, a pair of brackets connected to the pair of said end plates respectiely and a rotor placed in said can to be journaled by said brackets, a lubricating oil enclosing part being defined by said can, brackets and rotor, and a flexible pressure adjusting means placed in said insulating oil enclosing part to sealingly divide the interior of said insulating oil enclosing part into first and second chambers, wherein said flexible pressure adjusting means comprises a casing, and a sealed flexible member received in said casing to define the interior thereof as said second chamber communicated with a region exterior to said insulating oil enclosing part.

2. The liquid-seal type motor according to claim 1, wherein an end opening of said flexible pressure adjusting means is communicated with said lubricating oil enclosing part through a communicating passage formed in one of said end plates.

3. The liquid-seal type motor according to claim 1, wherein an end opening of said flexible pressure adjusting means is communicated with the atmosphere through an opening formed in the side wall of said frame.

4. The liquid-seal type motor acording to claim 1, wherein said flexible pressure adjusting means is a bellows.

5. The liquid-seal type motor according to claim 4, wherein said bellows is an annular bellows made of metal which surrounds the outer circumference of said can.

6. The liquid-seal type motor according to claim 5, wherein a cylindrical body is placed inside said annular metallic bellows, said cylindrical body being coaxial with said can and being adjacent the outer surface of said can.

7. The liquid-seal type motor according to claim 1, wherein said flexible pressure adjusting means is a diaphragm.

8. The liquid-seal type motor according to claim 3, wherein a filter is placed at the end opening of said flexible pressure adjusting means.

9. The liquid-seal type motor according to claim 1, wherein said flexible pressure adjusting means is a bellows of a shape of horseshoe which is sealingly connected to one of said end plates and the interior of which is communicated with said lubricating oil enclosing part, lead wires being extended between both ends of said bellows of a shape of horseshoe.

* * * * *